(12) United States Patent
Erismis

(10) Patent No.: US 8,955,381 B2
(45) Date of Patent: Feb. 17, 2015

(54) THREE-MASS COUPLED OSCILLATION TECHNIQUE FOR MECHANICALLY ROBUST MICROMACHINED GYROSCOPES

(75) Inventor: Mehmet Akif Erismis, Diest (BE)

(73) Assignee: IMEC, Leuven (BE)

( * ) Notice: Subject to any disclaimer, the term of this patent is extended or adjusted under 35 U.S.C. 154(b) by 329 days.

(21) Appl. No.: 13/613,770

(22) Filed: Sep. 13, 2012

(65) Prior Publication Data

US 2013/0061673 A1    Mar. 14, 2013

Related U.S. Application Data

(60) Provisional application No. 61/534,146, filed on Sep. 13, 2011.

(51) Int. Cl.
*G01C 19/56*    (2012.01)
*G01C 19/5733*    (2012.01)

(52) U.S. Cl.
CPC .................................. *G01C 19/5733* (2013.01)
USPC ....................................................... 73/504.12

(58) Field of Classification Search
CPC .................................................. G01C 19/5733
USPC ............................................ 73/504.12, 504.14
See application file for complete search history.

(56) References Cited

U.S. PATENT DOCUMENTS 5,895,850 A * 4/1999 Buestgens ................... 73/504.12
7,377,167 B2 * 5/2008 Acar et al. ................... 73/504.14

* cited by examiner

*Primary Examiner* — John Chapman, Jr.
(74) *Attorney, Agent, or Firm* — McDonnell Boehnen Hulbert & Berghoff LLP

(57) ABSTRACT

A micromachined gyroscope is disclosed comprising a substrate, three masses $m_1$, $m_2$, and $m_3$, configured to oscillate along a first direction x or y, whereby the first mass $m_1$ is mechanically coupled to the substrate, the second mass $m_2$ is mechanically coupled to the first mass $m_1$ and to substrate, and the third mass $m_3$ is mechanically coupled to the second mass $m_2$, whereby the weight and the spring constants $k_1$, $k_2$, $k_3$ of the respective masses $m_1$, $m_2$, and $m_3$ and mechanical couplings $k_{12}$, $k_{23}$ are selected, such that, during operation mass $m_2$ oscillates at a frequency substantially above the resonance frequencies of mass $m_1$ and mass $m_3$. The resonance frequency of mass $m_2$ may be at least 2 times, or even 2.5 times, higher than the resonance frequency of mass $m_1$ or $m_3$.

9 Claims, 6 Drawing Sheets

THREE-MASS COUPLED OSCILLATION TECHNIQUE FOR MECHANICALLY ROBUST MICROMACHINED GYROSCOPES

CROSS-REFERENCE TO RELATED APPLICATIONS

This application claims priority to U.S. Provisional Patent Application No. 61/534,146 filed on Sep. 13, 2011, the contents of which are hereby incorporated by reference.

BACKGROUND

Micromachined gyroscopes are angular rate sensors that typically operate according to a physical phenomenon called the Coriolis Effect. The Coriolis Effect is, simply, the deflection of moving objects viewed from a rotating frame. For an object mounted to a substrate, the object tends to oscillate (e.g., vibrate, move, or drive) in a perpendicular plane when the substrate rotates. Hence, in order to make use of the Coriolis Effect, micromachined gyroscopes may be composed of an oscillating part comprising at least one mass, and a sensing part which is free to move in a perpendicular plane of the oscillating part. The sensing part is affected by the rotation of the gyroscope, as the oscillating part will be deflected. Under an external rotation, the oscillating mass deflects, and that deflection is sensed via the movement of the sensing part.

The sensitivity of such an oscillating gyroscope depends on its oscillation magnitude. In order to achieve a stable and large sensitivity, stable and large oscillation amplitude is desirable.

Typically, a large oscillation is achieved by using a one-degree-of-freedom (1-DOF) oscillator that is operated at its resonant frequency. Stability is then obtained with the help of stabilization circuitry (e.g., phase lock loops (PLLs), proportional integral (PI) controllers, etc.) to keep the gyroscope operating near this resonance frequency.

In some cases, the 1-DOF oscillator may be operated at non-resonance frequency, thereby reducing the need for stabilisation circuitry. However, a magnitude of the oscillation at non-resonance frequencies will be less than a magnitude of the oscillation at the resonance frequency. When the oscillator is oscillating at non-resonance frequencies, though, changes in the frequency, as well as the quality factor, will have a lesser effect on the oscillation magnitude, as compared to when the oscillator is oscillating at the resonance frequency.

Typical gyroscopes consume 10 to 20 times more power than a typical accelerometer in commercial applications. Some of this power consumption results from the comb-drive actuation used in typical gyroscopes to obtain large oscillation magnitudes. Comb-drive actuation involves electrostatic forces being generated between two comb-like structures. One comb is fixed to the substrate while the other comb is movable. The force developed by the comb-drive actuator is proportional to the change in capacitance between the two combs. However, this capacitance increases with driving voltage difference between both combs, with the coupling area reflected by the number of comb teeth, and the gap between these teeth. As a result, achieving large oscillation magnitudes with comb-drive actuation requires large polarization voltage differences, typically 12V in commercial devices. Such high polarization voltage differences are not conducive to a low-power gyroscope. Another source of this power consumption may be stabilization circuitry, such as PLLs and/or PI controllers, used to stabilize the oscillation increase power consumption of the gyroscope, which is similarly not conducive to a low-power gyroscope. Other sources of power consumption exist as well.

One option for reducing the power consumption of a gyroscope is to use a two-degree-of-freedom (2-DOF) oscillator that includes two masses and, accordingly, has two resonance frequencies. The 2-DOF gyroscope may be operated in between the two resonance frequencies. The amplitude response typically has minimal dependency on the varying quality factor and the resonance frequencies. However, the magnitude of this response is still very small and comparable to the non-resonance response of the 1-DOF oscillator discussed above.

Accordingly, a micromachined gyroscope with reduced power consumption may be desirable. It may be desirable for such a micromachined gyroscope to have a stable oscillation frequency range with a high mechanical amplification between the actuator and the driving part.

SUMMARY

Disclosed is a gyroscope with reduced power consumption, as compared to typical gyroscopes. The disclosed gyroscope is designed without the need of stabilization circuitry, and with a reduced need for driving and controlling circuitry, thereby reducing the power consumption of the gyroscope.

In one aspect, a micromachined gyroscope is disclosed. The micromachined gyroscope comprises a substrate and at least three masses ($m_1$, $m_2$, $m_3$). The first mass $m_1$ is mechanically coupled to the substrate via a mechanical connection $k_1$, the second mass $m_2$ is mechanically coupled to the first mass $m_1$ via a connection $k_{12}$ and to the substrate via a mechanical connection $k_2$, and the third mass $m_3$ is mechanically coupled to the second mass $m_2$ via a mechanical connection $k_{23}$. The three masses are each configured to oscillate along a first direction x or y.

The following relationships exist between the masses $m_1$, $m_2$, $m_3$, and the mechanical connections $k_1$, $k_2$, $k_{12}$, $k_{23}$:

$$[(k_2+k_{12}+k_{23})/m_2] \gg ([(k_1+k_{12})/m_1] \sim [(k_{23})/m_3])$$

In some embodiments, the third mass $m_3$ is also mechanically coupled to the substrate via a mechanically connection $k_3$.

The masses $m_1$, $m_2$, and $m_3$ can be the driving masses of the gyroscope configured to oscillate along a first direction x. To this end, the gyroscope may further comprise actuators for stimulating these driving masses. These actuators may be parallel plate actuators.

In another embodiment, the micromachined gyroscope further comprises a duplicate $m_1'$, $m_2'$, and $m_3'$ of these 3 mass configuration and this duplicate is configured to oscillate along the first direction x but in opposite phase with these three masses $m_1$, $m_2$, and $m_3$.

The masses $m_1$, $m_2$, and $m_3$ can be the sensing masses of the gyroscope, which are configured to oscillate along a first direction y when the gyroscope is rotating.

In some embodiments, the three masses $m_1$, $m_2$, $m_3$ can be configured to oscillate in a linear way.

In another aspect, a micromachined gyroscope is disclosed comprising a substrate, a driving mass mechanically coupled to a sensing mass, both masses being movable in perpendicular directions and, when in operation under the influence of the Coriolis force, the driving mass causes the driving of the sensing mass, whereby at least one of the driving mass or of the sensing mass is configured as a connection of three masses $m_1$, $m_2$, $m_3$, whereby the first mass $m_1$ is mechanically coupled to the substrate, the second mass $m_2$ is mechanically coupled to the first mass $m_1$ and to the substrate, and the third mass $m_3$ is mechanically coupled to the second mass $m_2$, whereby the following relationship exist:

$$[(k_2+k_{12}+k_{23})/m_2] \gg ([(k_1+k_{12})/m_1] \sim [(k_{23})/m_3])$$

with $m_1$, $m_2$, $m_3$ being the weight of respectively mass $m_1$, $m_2$ and $m_3$, with $k_1$, $k_2$ (and $k_3$) being the spring constant of the mechanical connection between of the respective mass $m_1$ or $m_2$ or $m_3$ and the substrate, and with $k_{12}$, $k_{23}$ being the spring constant of the mechanical connection between mass $m_2$ and mass $m_1$ or mass $m_3$ respectively.

In yet another aspect, a micromachined gyroscope is disclosed comprising a substrate, three masses $m_1$, $m_2$, and $m_3$, configured to oscillate along a first direction x or y, whereby the first mass $m_1$ is mechanically coupled to the substrate, the second mass $m_2$ is mechanically coupled to the first mass $m_1$ and to substrate, and the third mass $m_3$ is mechanically coupled to the second mass $m_2$, whereby the weight and the spring constants $k_1$, $k_2$, $k_3$ of the respective masses $m_1$, $m_2$ and $m_3$ and mechanical couplings $k_{12}$, $k_{23}$ are selected, such that, during operation mass $m_2$ oscillates at a frequency substantially above the resonance frequencies of mass $m_1$ and mass $m_3$.

In some embodiments, the resonance frequency of mass $m_2$ is at least 2 times, or even 2.5 times, higher than the resonance frequency of mass $m_1$ or $m_3$.

In yet another aspect, a method for designing a micromachined gyroscope is disclosed. This micromachined gyroscope comprises a substrate, at least 3 masses $m_1$, $m_2$ and $m_3$ being configured to oscillate along a first direction x or y, whereby the first mass $m_1$ is mechanically coupled to the substrate, the second mass $m_2$ is mechanically coupled to the first mass $m_1$ and to substrate, and the third mass $m_3$ is mechanically coupled to the second mass $m_2$, whereby the following relationship exist:

$$[(k_2+k_{12}+k_{23})/m_2] \gg ([(k_1+k_{12})/m_1] \sim [(k_{23})/m_3])$$

with $m_1$, $m_2$, $m_3$ being the weight of respectively mass $m_1$, $m_2$ and $m_3$, with $k_1$, $k_2$ (and $k_3$) being the spring constant of the mechanical connection between of the respective mass $m_1$ or $m_2$ or $m_3$ and the substrate, and with $k_{12}$, $k_{23}$ being the spring constant of the mechanical connection between mass $m_2$ and mass $m_1$ or mass $m_3$ respectively.

The method comprises: selecting $m_1$, $m_3$, $k_1$ and $k_3$ whereby $[(k_1+k_{12})/m_1] \sim [(k_3+k_{23})/m_3]$, and selecting $m_2$, $k_2$ such that during operation of the gyroscope:

$$[(k_2+k_{12}+k_{23})/m_2] \gg ([(k_1+k_{12})/m_1] > [(k_3+k_{23})/m_3]).$$

The method further comprises selecting a mechanical amplification between the movement of mass $m_1$ and mass $m_3$ and dimensioning $k_2$ in view of this desired mechanical amplification.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
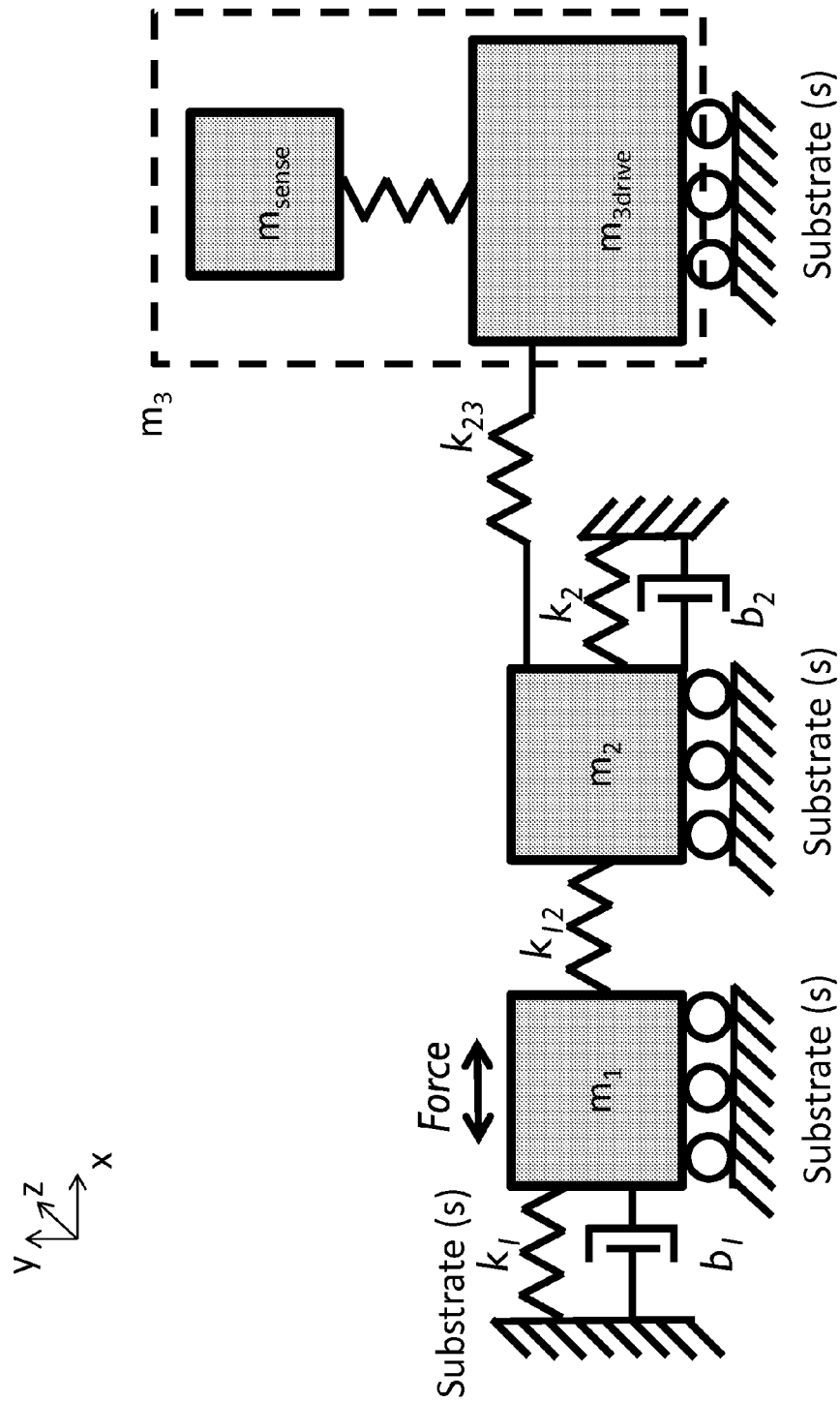
FIG. 1 shows a schematic mechanical equivalent of a micromachined gyroscope comprising three driving masses $m_1$, $m_2$, $m_3$ and one sensing mass $m_{sense}$, in accordance with an embodiment.

The present disclosure contains particular embodiments and with reference to certain drawings but the disclosure is not limited thereto. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure. Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may refer to different embodiments. Furthermore, the particular features, structures or characteristics may be combined in any suitable manner, as would be apparent to one of ordinary skill in the art from this disclosure, in one or more embodiments. The terms top, bottom, over, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein. It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a solution comprising components A and B" should not be limited to solution consisting only of components A and B. It means that with respect to the present disclosure, the only relevant components of the solution are A and B.

In this disclosure a micromachined gyroscope is disclosed. Such a micromachined gyroscope is an angular rate sensor that operates according to the Coriolis Effect described above. Such a micromachined gyroscope is manufactured using semiconductor process manufacturing steps.

More particularly, a micromachined gyroscope is disclosed comprising a configuration of 3 masses mechanically coupled to oscillate along a first direction y. In such a three-mass oscillation scheme, illustrated by FIG. 1, mass $m_1$ is coupled to mass $m_2$ and to the substrate, mass $m_2$ is coupled to mass $m_3$ and to the substrate, while mass $m_3$ drives the sensing part $m_{sense}$. Mass $m_3$ is only mechanically coupled to mass $m_1$ via the second mass $m_2$.

Mass $m_1$ is driven by actuators, which are typically electrostatically actuated. Although comb-drive actuators, when operated at lower voltages, can be used, it may be desirable to use parallel plate actuators, as they operate at lower voltages. Such parallel-plate actuators are more power-efficient, although they cannot provide large displacements due to their non-linear behavior. However, thanks to the mechanical amplification between the movement of mass $m_1$ and mass $m_3$ as discussed below, the small displacement of the parallel-plate actuators can be amplified, resulting in an appropriately higher oscillation amplitude of the third mass $m_3$. For example, the amplitude increase from peak to peak may be several micrometers.

The third mass $m_3$ is used as the oscillating mass which creates the Coriolis force upon external rotation. The deflection of mass $m_3$ is sensed by the mass $m_{sense}$ moving in a direction y perpendicular to the direction x along which the driving masses $m_1$, $m_2$, and $m_3$ oscillates. This mass $m_{sense}$ is, in the configuration illustrated by FIG. 1, directly coupled to mass $m_{3drive}$ and as such is part of the driving mass $m_3$.

The values of the masses $m_1$, $m_2$, $m_3$, spring constants $k_1$, $k_2$, $k_3$, $k_{12}$, $k_{23}$, and the damping levels $b_1$ and $b_2$ are designed to result in a large, and flat (e.g., constant) over a frequency range (e.g., 50 Hz or above), displacement response for mass $m_3$, and a mechanical amplification between mass $m_1$ and mass $m_3$ at this flat frequency response of mass $m_3$. Hence, the amplitude of the oscillation of mass $m_1$ can be small, typically less than 200 nm, or even 100 nm. As discussed above, this small oscillation amplitude of mass $m_1$ allows low voltage actuation of actuators (e.g., parallel-plate actuators or comb-drive actuators). Hence, the response of mass $m_3$ to the actuators will be robust without needing of any external circuitry, and overall power consumption will drop.

Figure 2:
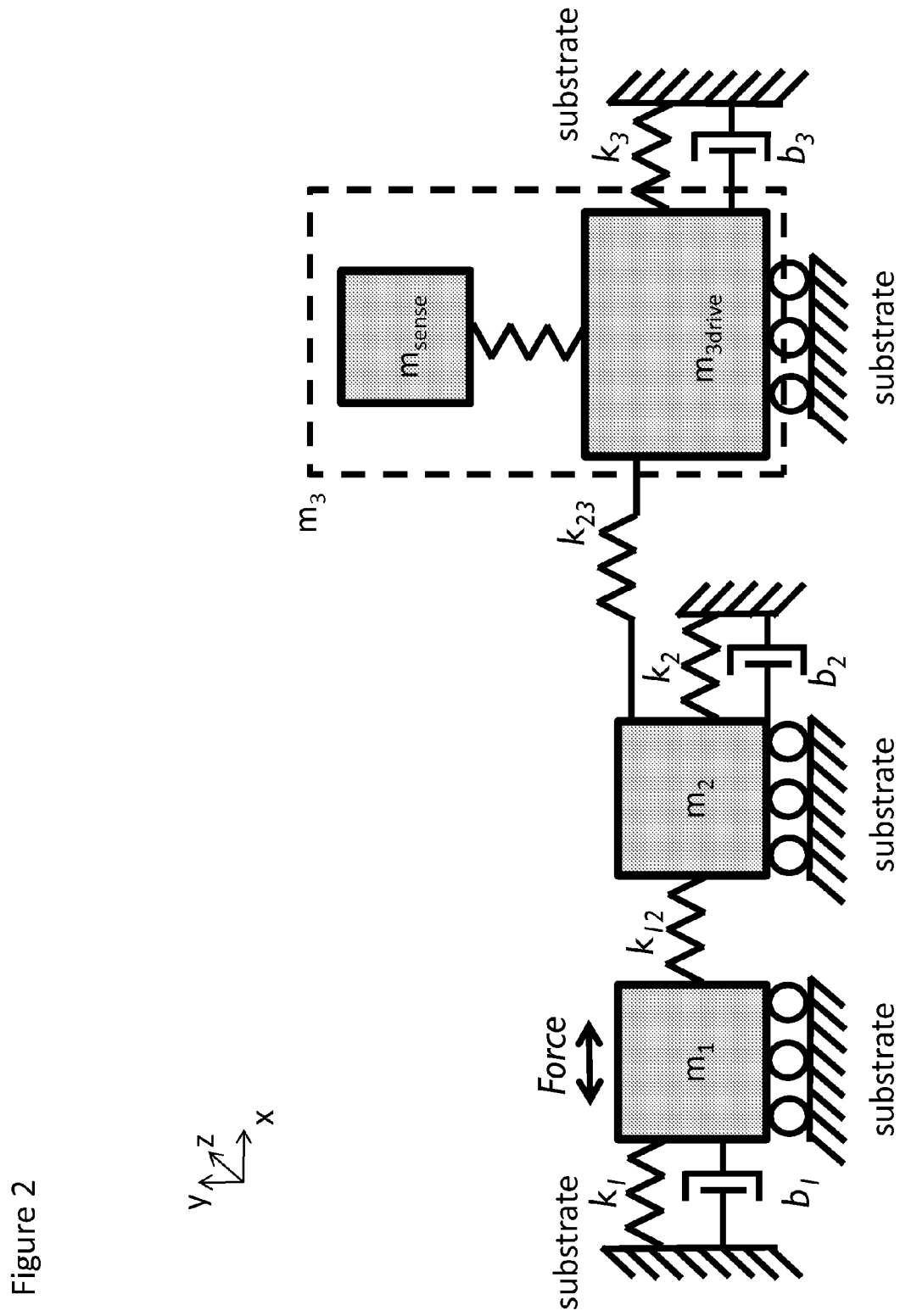
FIG. 2 shows a schematic mechanical equivalent of a micromachined gyroscope comprising three driving masses $m_1$, $m_2$, $m_3$ and one sensing mass $m_{sense}$, in which mass $m_3$ is coupled to the substrate, in accordance with an embodiment.

Whereas in FIG. 1 mass $m_3$ was not coupled to the substrate, FIG. 2 illustrates another embodiment where mass $m_3$ is mechanically coupled to the substrate as well. This coupling is modeled by a spring $k_3$ and a damping $b_3$. Such a configuration would accommodate for the imperfections coming from the fabrication of the micromachined gyroscope. If the springs $k_1$ and $k_3$ are designed in a similar shape, then even, if there is a process related imperfection, all springs $k_1$, $k_2$, $k_3$, $k_{12}$, $k_{23}$ are affected to the same degree. Moreover, anchoring all masses $m_1$, $m_2$ and $m_3$ to the substrate minimizes the mechanical stress related to buckling/bending of the cantilevered masses and allows a larger and flatter device.

The mechanical system illustrated by FIG. 2 can be modeled by three equations (1):

$$Force = m_1 \frac{\partial^2 x_1}{\partial x^2} + b_1 \frac{\partial x_1}{\partial x} + k_1 x_1 + (x_1 - x_2)k_{12}$$

$$0 = m_2 \frac{\partial^2 x_2}{\partial x^2} + b_2 \frac{\partial x_2}{\partial x} + k_2 x_2 + (x_2 - x_1)k_{12} + (x_2 - x_3)k_{23}$$

$$0 = m_3 \frac{\partial^2 x_3}{\partial x^2} + b_3 \frac{\partial x_3}{\partial x} + k_3 x_3 + (x_3 - x_2)k_{23}$$

From these 3 equations, the displacement responses of each mass $m_1$, $m_2$ and $m_3$ can be derived analytically (2):

$$X_1 = \frac{Force}{k_1 + k_{12} + j\omega b_1 - m_1\omega^2 - \dfrac{k_{12}^2}{k_{12} + k_2 + k_{23} + j\omega b_2 - m_2\omega^2 - \dfrac{k_{23}^2}{k_{23} + k_3 + j\omega b_3 - m_3\omega^2}}}$$

$$X_2 = \frac{X_1 k_{12}}{k_{12} + k_2 + k_{23} + j\omega b_2 - m_2\omega^2 - \dfrac{k_{23}^2}{k_{23} + k_3 + j\omega b_3 - m_3\omega^2}}$$

$$X_3 = \frac{X_2 k_{23}}{k_{23} + k_3 + j\omega b_3 - m_3\omega^2}$$

Figure 3:
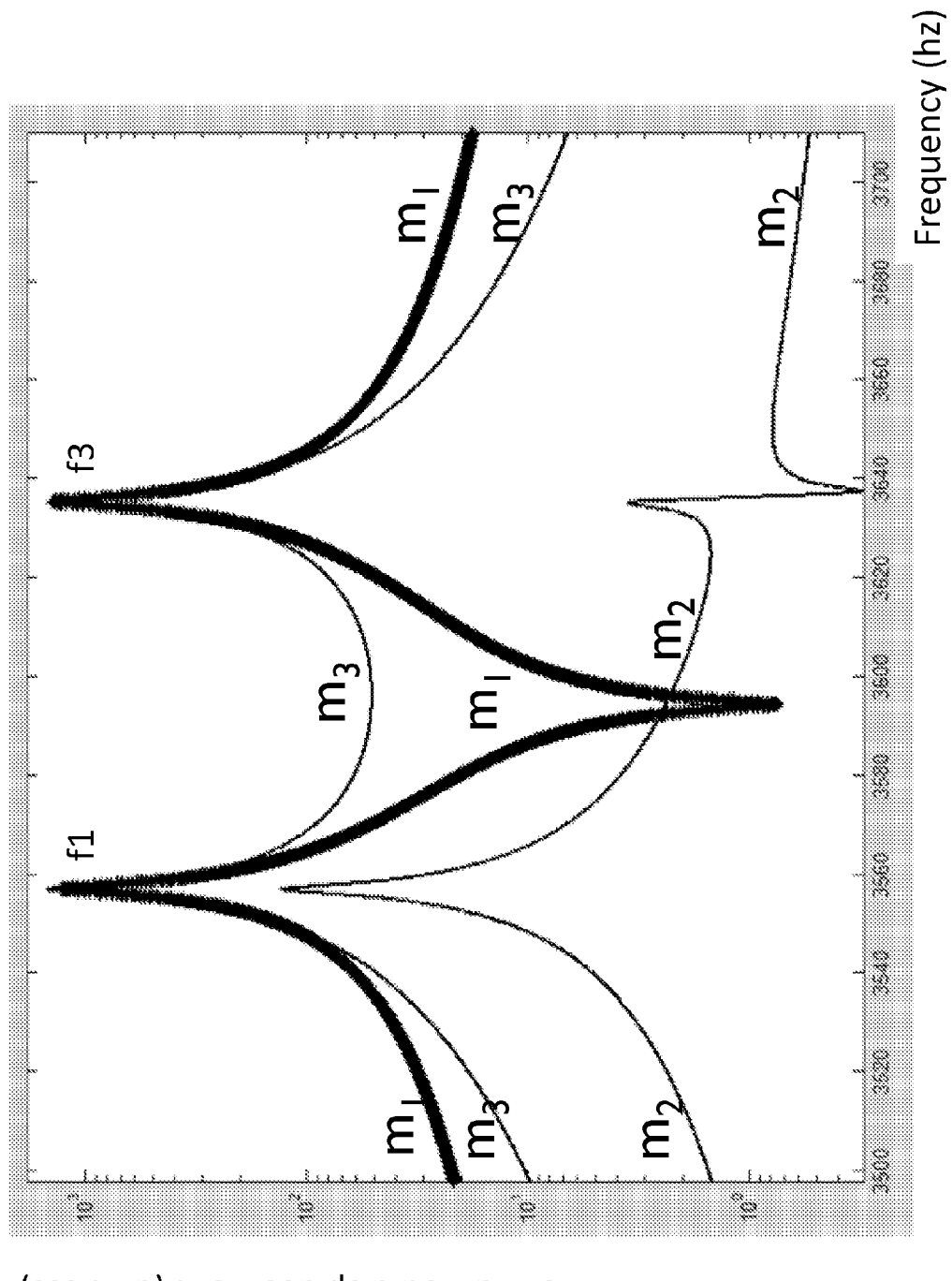
FIG. 3 shows the resonance behavior of the gyroscope shown in FIG. 2: normalized displacement response (unitless) vs. frequency (Hz), in accordance with an embodiment.

FIG. 3 illustrates the resonance behavior of the three mass coupled oscillation configuration. The frequency of the actuating force is swept and the displacement of the actuated mass is measured with respect to the DC displacement. Hence, the y-axis of FIG. 3 is representative for the quality factor of the oscillation peaks. In-between response peaks $f_1$ and $f_3$ a substantially flat response region is obtained. These two resonance peaks $f_1$ and $f_3$ are determined by the mass $m_1$ and mass $m_3$, when the resonance frequency of mass $m_2$ is selected to be higher than either of both resonance peaks.

In order to achieve a flat and large mass $m_3$ response and a mechanical amplification between mass $m_1$ and mass $m_3$, the following design method is applied. First, mass $m_2$ is considered to be a non-moving rigid body whereby $k_2$ is assumed to be infinitive. Hence, the motion of mass $m_1$ and mass $m_3$ can be determined separately. Then, the resonant frequencies $f_1$ and $f_3$ of respectively mass $m_1$ and mass $m_3$ are equated to each other, assuming that mass $m_2$ had no impact, as shown in equation (3):

$$\frac{k_1 + k_{12}}{m_1} = \frac{k_{23} + k_3}{m_3}$$

If the damping levels $b_1$ and $b_2$, and when coupled to the substrate $b_3$, are low enough, the finite $k_2$ value will cause the resonant frequencies $f_1$ of mass $m_1$ and $f_3$ of mass $m_3$ to separate from each other and form a robust response plateau in-between and a mechanical amplification between mass $m_1$ and mass $m_3$. The separation of mass $m_1$ and mass $m_3$ resonant frequencies and the response level of mass $m_3$ at the plateau depend on the value of $k_2$. The higher $k_2$ is, the smaller the separation and the larger the response will be.

This mechanical amplification can be further improved by increasing the vacuum level of the environment in which the gyroscope operates or the quality factor of the individual peaks.

The position of the anti-resonance frequency of mass $m_1$, where the mechanical amplification is the highest from mass $m_1$ towards mass $m_3$, can be tuned by changing $k_1$. The value of $k_1$ can be easily tuned if parallel plate actuators are used to actuate mass $m_1$. However, from the application point of view, one might prefer to not operate at the anti-resonance frequency of mass $m_1$, because that will be unstable for mass $m_1$. In that case, the gyroscope is operated slightly off the anti-resonance frequency of mass $m_1$ and the mechanical amplification ratio from mass $m_1$ to mass $m_3$ will be around 20-30 regardless of the vacuum level.

The damping levels $b_1$, $b_2$ (and $b_3$ when present) or the quality factors of each resonant peak $f_1$ and $f_3$ have an important role on the operation of the gyroscope. If the quality factors are not large enough, the coupling cannot occur and the plateau cannot be formed.

The selection of the quality factors of the resonance frequencies $f_1$ and $f_3$ is a design criterion. The larger $k_2$ is, the larger the quality factors of both resonance frequencies should be. As a rule of thumb, these quality factor values should be one order of magnitude larger than the ratio of mass $m_2$ resonant frequency to the average frequency of the plateau between the resonance frequency $f_1$ and $f_3$ of mass $m_1$ and $m_3$ when coupled via mass $m_2$ due to the finite value of spring $k_2$.

The position of the anti-resonance of mass $m_1$ does not have to be at the mid-point of this plateau. This position depends on the ratio of mass $m_1$ to mass $m_3$, but can be tuned by altering $k_1$. So, although during the initial design phase the resonant frequencies of $m_1$ and $m_3$ are equated to each other $f_1 \sim f_3$, thereby assuming mass $m_2$ to be a non-moving body, at the end, equation (3) does not have to hold due to changed $k_1$.

The mechanical amplification between $m_1$ and $m_3$ depends on the operating frequency. If the operating frequency is at the anti-resonance of mass $m_1$, the amplification ratio will be the maximum. However, this situation can bring instability to the mass $m_1$ motion. It is proposed to operate slightly off anti-resonance. In this case the mechanical amplification ratio can realistically be 20-30.

Figure 4:
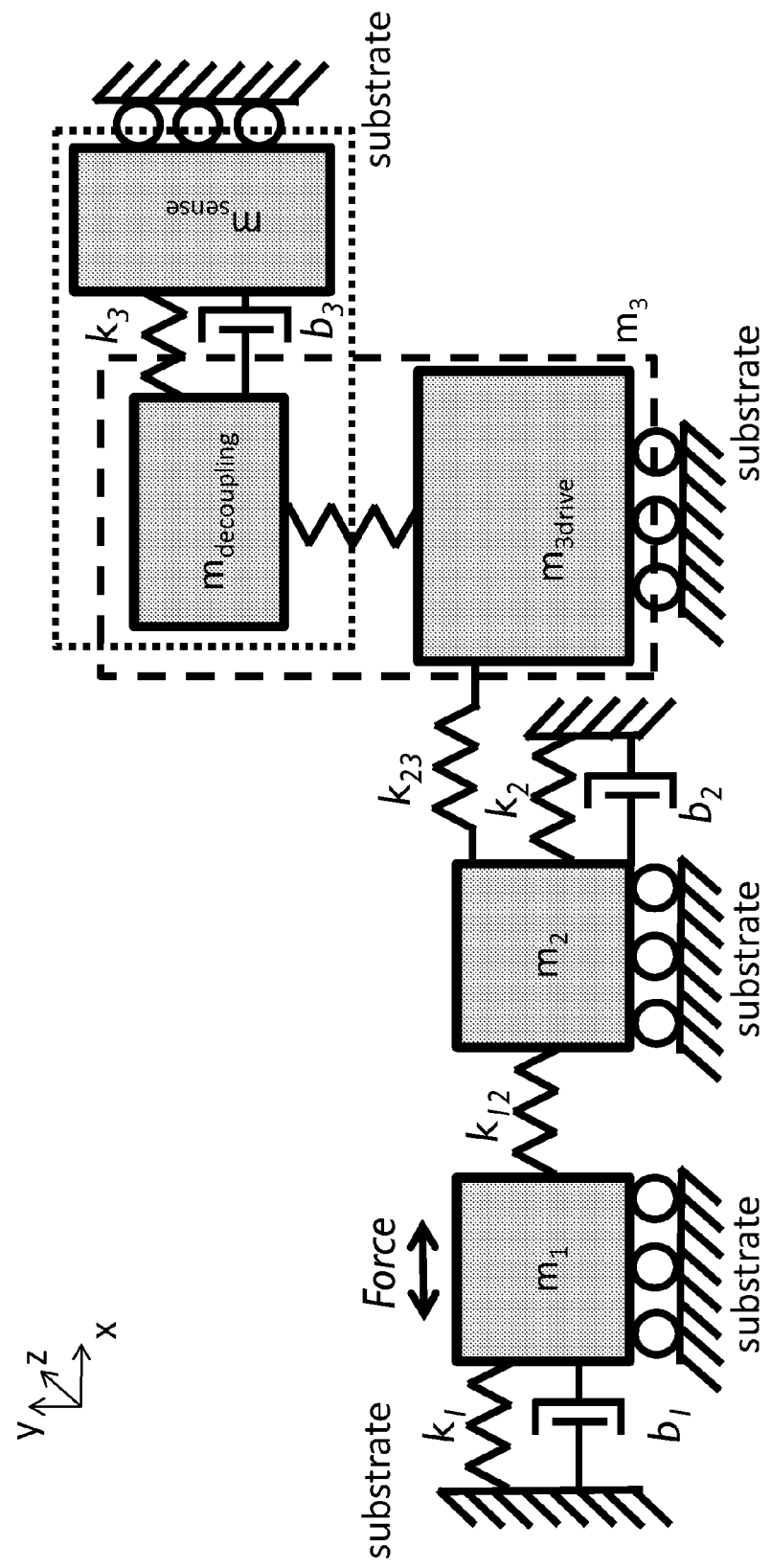
FIG. 4 shows a schematic mechanical equivalent of a micromachined gyroscope comprising three driving masses $m_1$, $m_2$, $m_3$ and one sensing mass $m_{sense}$ whereby the sensing mass is decoupled from the driving mass $m_3$, in accordance with an embodiment.
Figure 5:
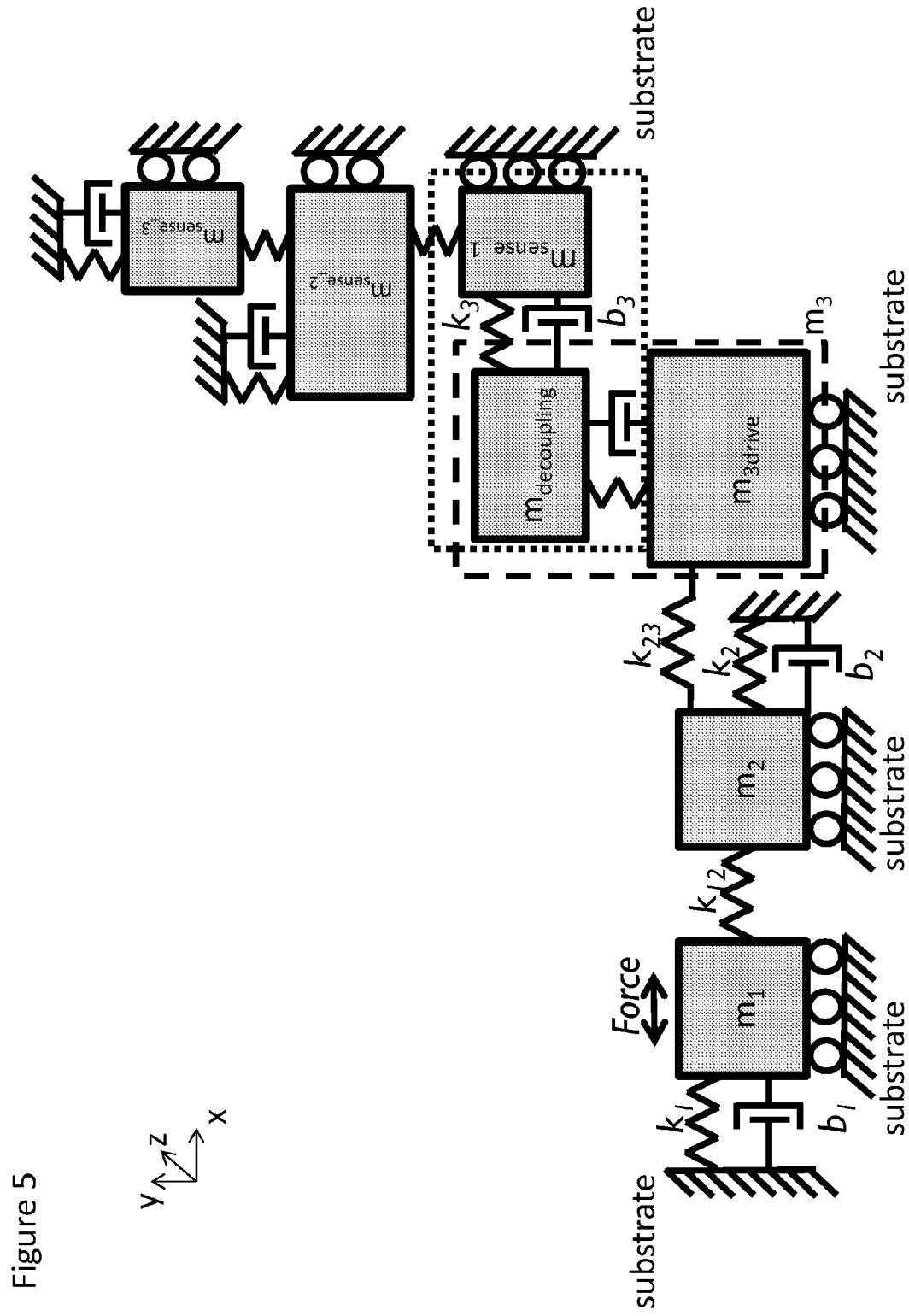
FIG. 5 shows a schematic mechanical equivalent of a micromachined gyroscope comprising three driving masses $m_1$, $m_2$, $m_3$ and 3 sensing mass $m_{sense\text{-}2}$, $m_{sense\text{-}3}$ whereby the sensing masses are decoupled from the driving mass $m_3$, in accordance with an embodiment.
Figure 6:
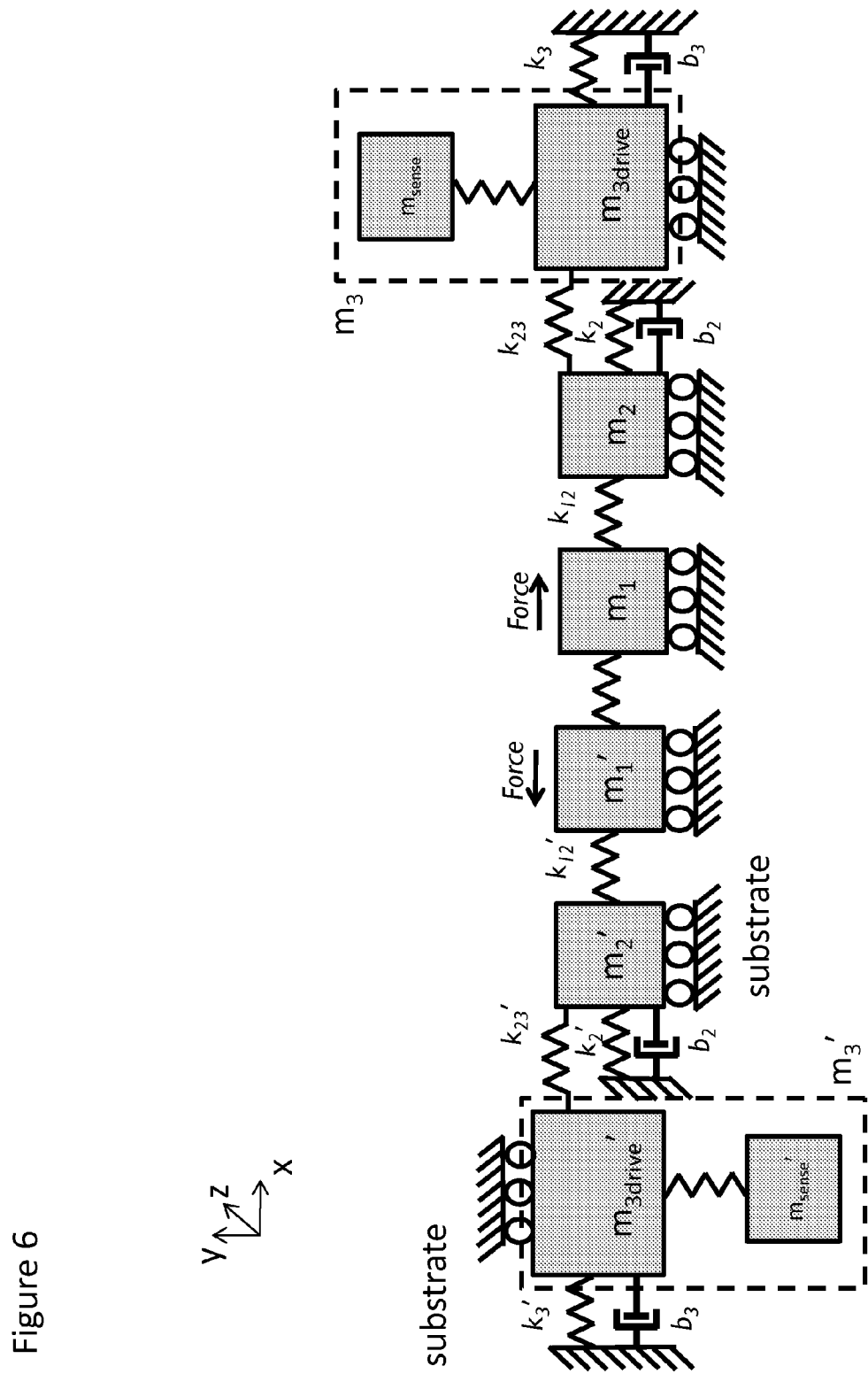
FIG. 6 shows a schematic mechanical equivalent of a micromachined gyroscope comprising the driving masses $m_1$, $m_2$, $m_3$ are arranged in a tuning fork configuration and one sensing mass $m_{sense}$, in accordance with an embodiment.

FIGS. 4, 5, and 6 show alternative embodiments. The proposed three-mass coupled oscillation technique can be used wherever a 1-DOF oscillator is used within vibrating gyroscopes. Decoupled or non-decoupled sense and drive schemes and a tuning fork topology can be used. Moreover, this three-mass oscillation topology can be used in the sensing part of the gyroscope to achieve a large bandwidth and an amplified sensitivity.

FIG. 4 illustrates a micromachined gyroscope comprising three driving masses $m_1$, $m_2$, and $m_3$ with mass $m_1$ is coupled ($k_1$, $b_1$) to the substrate and to ($k_{12}$) mass $m_2$, $m_2$ is coupled to the substrate ($k_2$,$b_2$) and to ($k_{23}$), while the mass $m_3$ and mass $m_{3drive}$ drives the sensing mass $m_{sense}$ via the decoupling mass $m_{decoupling}$.

FIG. 5 illustrates a micromachined gyroscope comprising three driving masses $m_1$, $m_2$, and $m_3$ with mass $m_1$ being coupled ($k_1$, $b_1$) to the substrate and to ($k_{12}$) mass $m_2$, $m_2$ is coupled to the substrate ($k_2$, $b_2$) and to ($k_{23}$) the mass $m_3$ and mass $m_3$ drives the sensing mass $m_{sense}$ via the decoupling mass $m_{decoupling}$. In this embodiment also the sensing mass $m_{sense}$ is configured as a connection for the masses $m_{sense-1}$, $m_{sense-2}$, $m_{sense-3}$, whereby mass $m_{sense-2}$ is coupled to the substrate and to mass $m_{sense-2}$, $m_{sense-2}$ is coupled to the substrate and the mass $m_{sense-3}$. In this configuration a stable oscillation frequency range for the driving masses is obtained whereby the movement of mass $m_1$ is mechanically amplified to mass $m_3$, but also a stable sensing frequency range is obtained whereby the movement of mass $m_{sense-1}$ is mechanically amplified to mass $m_{sense-3}$.

FIG. 6 illustrates a micromachined gyroscope comprising three driving masses $m_1$, $m_2$, and $m_3$ in a tuning fork configuration with mass $m_1$ being coupled ($k_1$, $b_1$) to the substrate and to ($k_{12}$) mass $m_2$, mass $m_2$ being coupled to the substrate ($k_2$,$b_2$) and to ($k_{23}$) the mass $m_3$, and mass $m_{3drive}$ driving the sensing mass $m_{sense}$. It further comprises a second series of three driving masses $m_1'$, $m_2'$, and $m_3'$ with mass $m_1'$ being coupled to mass $m_1$ and to ($k_{12}'$) mass $m_2'$, $m_2'$ being coupled to the substrate and to ($k_{23}'$) the mass $m_3'$, and mass $m_3'$ driving the sensing mass $m_{sense}'$. Both series of three mechanically coupled driving mass $m_1$, $m_2$, and $m_3$ and $m_1'$, $m_2'$, and $m_3'$ are actuated by the same actuators.

A number of example embodiments are contemplated. In one example embodiment, a micromachined gyroscope may include a substrate and three masses configured to oscillate along a first direction. The first mass $m_1$ may be mechanically coupled to the substrate, the second mass $m_2$ may be mechanically coupled to the first mass $m_1$ and to substrate, and the third mass $m_3$ may be mechanically coupled to the second mass $m_2$. The gyroscope may be defined as follows: $[(k_2+k_{12}+k_{23})/m_2] \gg ([(k_1+k_{12})/m_1] \sim [(k_{23})/m_3])$, where $m_1$, $m_2$, $m_3$ are the weights of, respectively, the masses $m_1$, $m_2$ and $m_3$, $k_1$, $k_2$ being the spring constant of the mechanical connection between of the respective mass and the substrate, and $k_{12}$, $k_{23}$ being the spring constant of the mechanical connection between $m_2$ and $m_1$ and $m_2$ and $m_3$, respectively.

In some embodiments, the third mass $m_3$ may be mechanically coupled to the substrate and the following relationship may exist:

$$[(k_2+k_{12}+k_{23})/m_2] \gg [(k_1+k_{12})/m_1] \sim [k_3+k_{23})/m_3]$$

where $k_3$ is the spring constant of the mechanical connection between of the mass $m_3$ and the substrate.

In some embodiments, the three masses may be driving masses. The gyroscope may further include driving means to drive the first mass $m_1$. The driving means may be, for example, one or more parallel plate electrostatic actuators.

In some embodiments, the three masses may be sensing masses configured to move when the gyroscope rotates.

In some embodiments, the gyroscope may further include a duplicate of the three-mass configuration. The duplicate may be configured to oscillate along the first direction in opposite phase with the three-mass configuration.

In some embodiments, the masses may be configured to oscillate linearly.

In another example embodiment, a method for designing a micromachined gyroscope may include selecting $m_1$, $m_3$, $k_1$ and $k_3$ such that $[(k_1+k_{12})/m_1] \sim [k_3+k_{23})/m_3]$. The method may further include selecting $m_2$, $k_2$ such that during operation:

$$[(k_2+k_{12}+k_{23})/m_2] \gg [(k_1+k_{12})/m_1] > [k_3+k_{23})/m_3].$$

In some embodiments, the method may further comprises selecting a mechanical amplification between the movement of mass $m_1$ and mass $m_3$, and dimensioning $k_2$ in view of this desired mechanical amplification.

The invention claimed is:

1. A micromachined gyroscope comprising a three-mass configuration that includes a substrate and three masses configured to oscillate in a first direction, wherein:
 a first mass having a first weight $m_1$ is mechanically coupled to the substrate;
 a second mass having a second weight $m_2$ is mechanically coupled to the first mass and to the substrate; and
 a third mass having a third weight $m_3$ is mechanically coupled to the second mass, wherein the following relationship exist:

$$[(k_2+k_{12}+k_{23})/m_2] \gg ([(k_1+k_{12})/m_1] \sim [(k_{23})/m_3])$$

wherein $k_1$ is a spring constant of a mechanical connection between the first mass and the substrate, $k_2$ is a spring constant of a mechanical connection between the second mass and the third substrate, $k_{12}$ is a spring constant of a mechanical connection between the first mass and the second mass, and $k_{23}$ is a spring constant of a mechanical connection between the second mass and the third mass.

2. The micromachined gyroscope of claim 1, wherein the third mass is mechanically coupled to the substrate, and wherein the following relationship exists:

$$[(k_2+k_{12}+k_{23})/m_2] \gg [(k_1+k_{12})/m_1] \sim [k_3+k_{23})/m_3]$$

wherein $k_3$ is a spring constant of a mechanical connection between the third mass and the substrate.

3. The micromachined gyroscope of claim 1, wherein the three masses are driving masses, and further comprising driving means to drive the first mass.

4. The micromachined gyroscope of claim 3, wherein the driving means are parallel plate electrostatic actuators.

5. The micromachined gyroscope claim 1, wherein the three masses are sensing masses configured to move when the micromachined gyroscope is rotated.

6. The micromachined gyroscope of claim 1, further comprising a duplicate of the three-mass configuration, wherein the duplicate is configured to oscillate in the first direction but in an opposite phase of the three-mass configuration.

7. The micromachined gyroscope of claim 1 wherein, the three masses are configured to oscillate linearly.

8. A method for designing a micromachined gyroscope comprising:
  selecting a first mass having a first weight $m_1$;
  selecting a second mass having a second weight $m_2$;
  selecting a third mass having a third weight $m_3$;
  selecting a first spring constant $k_1$ for a mechanical connection between the first mass and a substrate;
  selecting a second spring constant $k_2$ for a mechanical connection between the second mass and the substrate;
  selecting a third spring constant $k_3$ for a mechanical connection between the third mass and the substrate;
  selecting a fourth spring constant $k_{12}$ for a mechanical connection between the first mass and the second mass; and
  selecting a fifth spring constant $k_{23}$ for a mechanical connection between the second mass and the third mass, wherein:

$$[(k_1+k_{12})/m_1] \sim [(k_3+k_{23})/m_3];$$

and wherein, during operation of the micromachined gyroscope:

$$[(k_2+k_{12}+k_{23})/m_2] \gg [(k_1+k_{12})/m_1] > [(k_3+k_{23})/m_3].$$

9. A method according to claim 8, further comprising:
  selecting a mechanical amplification between a movement of the first mass and a movement of the third mass; and
  dimensioning the second spring constant $k_2$ in view of the mechanical amplification.

* * * * *